United States Patent
Jin et al.

(10) Patent No.: US 10,367,216 B2
(45) Date of Patent: Jul. 30, 2019

(54) METHOD AND SYSTEM FOR CONTROLLING ENERGY SUPPLY IN FUEL CELL VEHICLE

(71) Applicants: HYUNDAI MOTOR COMPANY, Seoul (KR); KIA MOTORS CORPORATION, Seoul (KR)

(72) Inventors: Young Pin Jin, Yongin-si (KR); Sung Ho Yang, Ansan-si (KR); Jae Young Shim, Yongin-si (KR); Kang Sik Jeon, Hwaseong-si (KR); Ji Hwan Yu, Uiwang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 225 days.

(21) Appl. No.: 15/623,255

(22) Filed: Jun. 14, 2017

(65) Prior Publication Data
US 2018/0198144 A1  Jul. 12, 2018

(30) Foreign Application Priority Data
Jan. 9, 2017  (KR) .......................... 10-2017-0002976

(51) Int. Cl.
*B60L 50/60*    (2019.01)
*B60L 58/21*    (2019.01)
(Continued)

(52) U.S. Cl.
CPC ......... *H01M 8/04992* (2013.01); *B60L 50/66* (2019.02); *B60L 58/21* (2019.02);
(Continued)

(58) Field of Classification Search
CPC ......... H01M 8/04992; H01M 8/04552; H01M 8/04559; H01M 8/04873; H01M 8/0491;
(Continued)

(56) References Cited

U.S. PATENT DOCUMENTS

| 4,962,462 A * | 10/1990 | Fekete ................ H01M 16/006 700/297 |
| 2007/0159007 A1* | 7/2007 | King .................... H02J 7/0024 307/71 |
| 2011/0155494 A1* | 6/2011 | Haas ....................... B62M 6/40 180/206.1 |

FOREIGN PATENT DOCUMENTS

| JP | 2009-129783 A | 6/2009 |
| JP | 2009-158399 A | 7/2009 |

(Continued)

OTHER PUBLICATIONS

Korean Notice of Allowance dated Dec. 17, 2018 issued in Korean Patent Application No. 10-2017-0002976 (with English translation).

*Primary Examiner* — Gregg Cantelmo
(74) *Attorney, Agent, or Firm* — Morgan, Lewis & Bockius LLP (57) ABSTRACT

A method of controlling energy supply in a fuel cell vehicle includes storing an output current of a fuel cell as a pre-limited current when a cell voltage ratio reaches a minimum cell voltage ratio, setting a limited output current of the fuel cell as the pre-limited current when the cell voltage ratio reaches a hazard cell voltage ratio, connecting first and second high-voltage batteries to a main bus terminal in parallel when the cell voltage ratio reaches the hazard cell voltage ratio, and outputting a supplementary current from the second high-voltage battery by an insufficient amount of the output current of the fuel cell for the pre-limited current, and a system for performing the same.

13 Claims, 4 Drawing Sheets

(51) Int. Cl.
    *B60L 58/31*     (2019.01)
    *B60L 58/40*     (2019.01)
    *H01M 16/00*     (2006.01)
    *H01M 8/04537*     (2016.01)
    *H01M 8/04858*     (2016.01)
    *H01M 8/04992*     (2016.01)

(52) U.S. Cl.
    CPC ............... *B60L 58/31* (2019.02); *B60L 58/40* (2019.02); *H01M 8/0491* (2013.01); *H01M 8/04552* (2013.01); *H01M 8/04559* (2013.01); *H01M 8/04873* (2013.01); *H01M 16/006* (2013.01); *B60L 2240/549* (2013.01); *H01M 2250/20* (2013.01); *H01M 2250/402* (2013.01); *Y02B 90/12* (2013.01); *Y02T 10/7061* (2013.01); *Y02T 90/32* (2013.01); *Y02T 90/34* (2013.01)

(58) Field of Classification Search
    CPC ........... H01M 16/006; H01M 2250/20; H01M 2250/402; B60L 50/66; B60L 58/21; B60L 58/40; B60L 58/31; B60L 2240/549; Y02B 90/12; Y02T 10/7061; Y02T 90/32; Y02T 90/34
    See application file for complete search history.

(56) References Cited

FOREIGN PATENT DOCUMENTS

| | | |
|---|---|---|
| JP | 2012-009406 A | 1/2012 |
| JP | 5215576 B2 | 6/2013 |
| JP | 2013-232412 A | 11/2013 |
| KR | 10-2011-0028161 A | 3/2011 |
| KR | 10-2013-0042691 A | 4/2013 |
| KR | 10-1351349 B1 | 1/2014 |
| KR | 10-2014-0051283 A | 4/2014 |

\* cited by examiner

METHOD AND SYSTEM FOR CONTROLLING ENERGY SUPPLY IN FUEL CELL VEHICLE

CROSS REFERENCE TO RELATED APPLICATION

The present application claims the benefit of priority to Korean Patent Application No. 10-2017-0002976 filed on Jan. 9, 2017, the entire contents of which is incorporated herein for all purposes by this reference.

TECHNICAL FIELD

The present disclosure relates to a method and system for controlling energy supply in a fuel cell vehicle, capable of enhancing durability of a fuel cell and effectively managing a high-voltage battery by preventing abnormal behavior of a vehicle and predicting a drop in cell voltage in protecting the fuel cell with a current limit when a voltage of the fuel cell drops.

BACKGROUND

A fuel cell stack consists of hundreds of unit cells, and for each of hundreds of channels, each of which is formed by tying these two to four cells in a bundle, an average cell voltage is sensed by a device in a vehicle. This device is referred to as an SVM (Stack Voltage Monitor) that plays an important role in monitoring performance of each individual cell of the fuel cell stack.

If the average cell voltage of a specific channel (formed by tying four cells) is lower than normal (if a cell leak occurs), there is a strong possibility that a voltage of one cell may drop in practice since gas is not properly supplied thereto due to deterioration of, or flooding in, the stack. In this case, the cell is seriously damaged due to an inverse voltage generated by continuous extraction of a current from the cell, resulting in rapid deterioration of the cell. To prevent this, a fuel cell control unit (FCU) controls a cell so as to prevent secondary damage of the cell by limiting a current.

However, the cell leak is often not prevented by the current limit of the FCU since the cell leak is fast. In this case, the cell leak may occur at a time opposite to that of a maximum current limit. Because of this, the current limit may not be imposed while the cell leak occurs, whereas the current limit may be imposed while the cell leak does not occur. Due to repetition of such a situation the vehicle may exhibit abnormal behavior such as lurching.

Accordingly, there is a need for a control method of preventing abnormal behavior of a vehicle by sensing a sign of cell leak in advance and performing a suitable current limit at an appropriate time.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems in the related art, and the present disclosure is intended to propose a method and system for controlling energy supply in a fuel cell vehicle, capable of enhancing durability of a fuel cell and effectively managing a high-voltage battery by preventing abnormal behavior of a vehicle and predicting a drop in cell voltage in protecting the fuel cell with a current limit when a voltage of the fuel cell drops.

In accordance with one aspect of the present disclosure, a method of controlling energy supply in a fuel cell vehicle includes steps of storing an output current of a fuel cell as a pre-limited current when a cell voltage ratio, which is obtained by dividing a minimum cell voltage by an average cell voltage, reaches a minimum cell voltage ratio, monitoring the cell voltage ratio, setting a limited output current of the fuel cell as the pre-limited current when the cell voltage ratio reaches a hazard cell voltage ratio, connecting first and second high-voltage batteries to a main bus terminal in parallel when the cell voltage ratio reaches the hazard cell voltage ratio, and outputting a supplementary current from the second high-voltage battery by an insufficient amount of the output current of the fuel cell for the pre-limited current when the output current of the fuel cell reaches a predetermined range of the limited output current that is set as the pre-limited current.

The minimum cell voltage ratio may be a minimum value at which no inverse voltage is generated when an output is generated in the fuel cell.

The hazard cell voltage ratio may be greater than the minimum cell voltage ratio.

In the step of setting a limited output current of the fuel cell as the pre-limited current, when the cell voltage ratio reaches the hazard cell voltage ratio and a drop rate of change in the minimum cell voltage is higher than a drop rate of change in the average cell voltage, the limited output current of the fuel cell may be set as the pre-limited current.

The method may further include connecting the first and second high-voltage batteries in series when an ignition key or ignition of a vehicle is off.

In the step of connecting first and second high-voltage batteries to the main bus terminal in parallel, when the cell voltage ratio reaches the hazard cell voltage ratio, a required output for a system may be generated only by the fuel cell, and the first and second high-voltage batteries may be boosted, such that a voltage at each output end thereof reaches a voltage at an output end of the fuel cell, and then be connected in parallel to the main bus terminal.

After the step of outputting the supplementary current from the second high-voltage battery, when a required output for a system is equal to or less than a reference value, the step of outputting the supplementary current from the second high-voltage battery may be stopped.

In the step of storing the output current of the fuel cell as the pre-limited current, the output current of the fuel cell may be stored as the pre-limited current when the cell voltage ratio, which is obtained by dividing the minimum cell voltage by the average cell voltage, reaches the minimum cell voltage ratio in a state in which a required output for a system is equal to or more than a reference value.

In the step of outputting the supplementary current from the second high-voltage battery, when the output current of the fuel cell reaches the predetermined range of the limited output current that is set as the pre-limited current, the pre-limited current may be set as a limited holding current, and the supplementary current may be outputted from the second high-voltage battery by an insufficient amount of the output current of the fuel cell for the limited holding current.

In accordance with an aspect of the present disclosure, a system for controlling energy supply in a fuel cell vehicle, the system performing the method of controlling energy supply in a fuel cell vehicle according to one aspect the present disclosure, the system includes a switch configured to realize a division mode, in which first and second high-voltage batteries are connected in parallel to a main bus terminal through a respective first and second converter, or an integration mode in which the first and second high-voltage batteries are connected in series while being connected in parallel to the main bus terminal through the second converter, a voltage sensor configured to detect a voltage of each fuel cell, a memory configured to store a minimum cell voltage ratio, a hazard cell voltage ratio, a limited output current, and a pre-limited current, and a controller for controlling driving of the switch and the fuel cell, the controller being configured to: update the pre-limited current in the memory as an output current of the fuel cell when a cell voltage ratio reaches the minimum cell voltage ratio, set the limited output current of the fuel cell as the pre-limited current and switch to the division mode for the first and second high-voltage batteries through the switch when the cell voltage ratio reaches the hazard cell voltage ratio, and control the second converter so as to output a supplementary current from the second high-voltage battery by an insufficient amount of the output current of the fuel cell for the pre-limited current when the output current of the fuel cell reaches a predetermined range of the limited output current that is set as the pre-limited current.

The first high-voltage battery and the first converter may be connected to a first circuit, the second high-voltage battery and the second converter may be connected to a second circuit, and the first and second circuits may be separated from or connected to each other through first and second switches.

The first switch may be provided between the first high-voltage battery and the second high-voltage battery so that the first and second high-voltage batteries are separate from each other or connected in series.

The second switch may be provided between the first circuit and the second circuit at a point between the first and second high-voltage batteries and the first and second converters so that the first and second circuits are separated from each other or connected in series.

As apparent from the above description, the method and system for controlling energy supply in a fuel cell vehicle according to the present disclosure can enhance durability of the fuel cell and effectively manage the high-voltage battery by preventing the abnormal behavior of the vehicle and predicting the drop in cell voltage in protecting the fuel cell with the current limit when the voltage of the fuel cell drops.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF PREFERRED EMBODIMENTS

A method and system for controlling energy supply in a fuel cell vehicle according to the preferred embodiments of the present disclosure will be described below with reference to the accompanying drawings.

Figure 1:
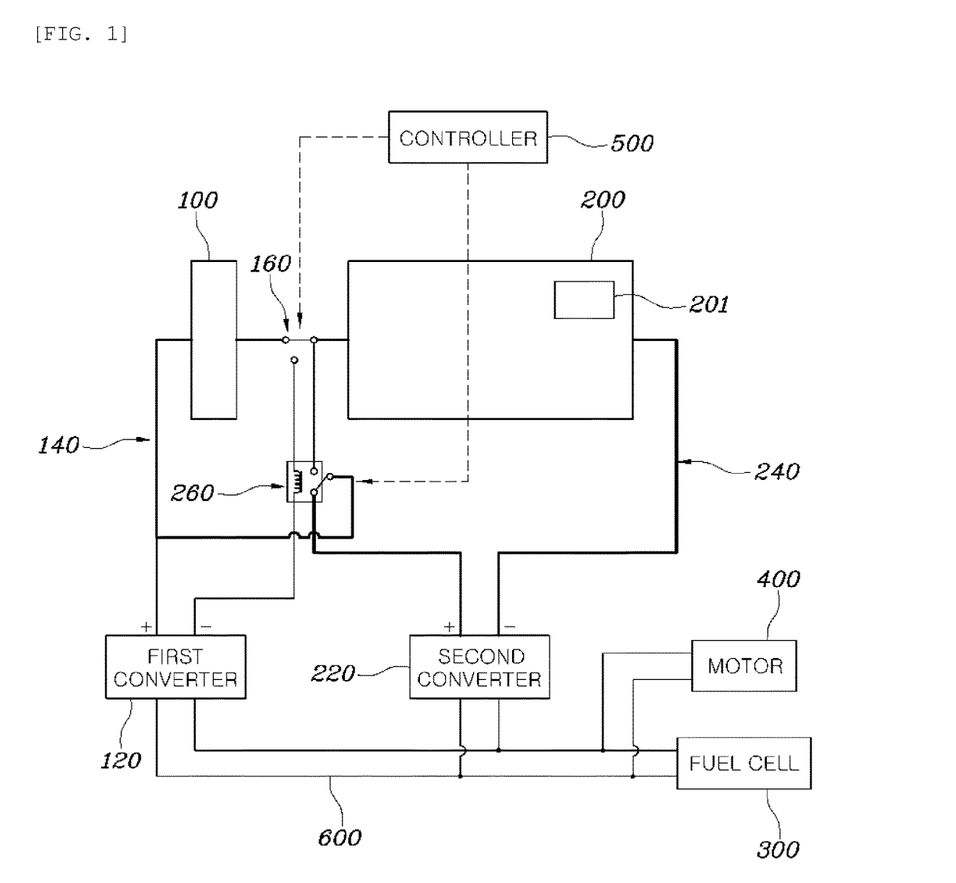
FIGS. 1 and 2 are diagrams illustrating a system for controlling energy supply in a fuel cell vehicle according to an embodiment of the present disclosure.
Figure 2:
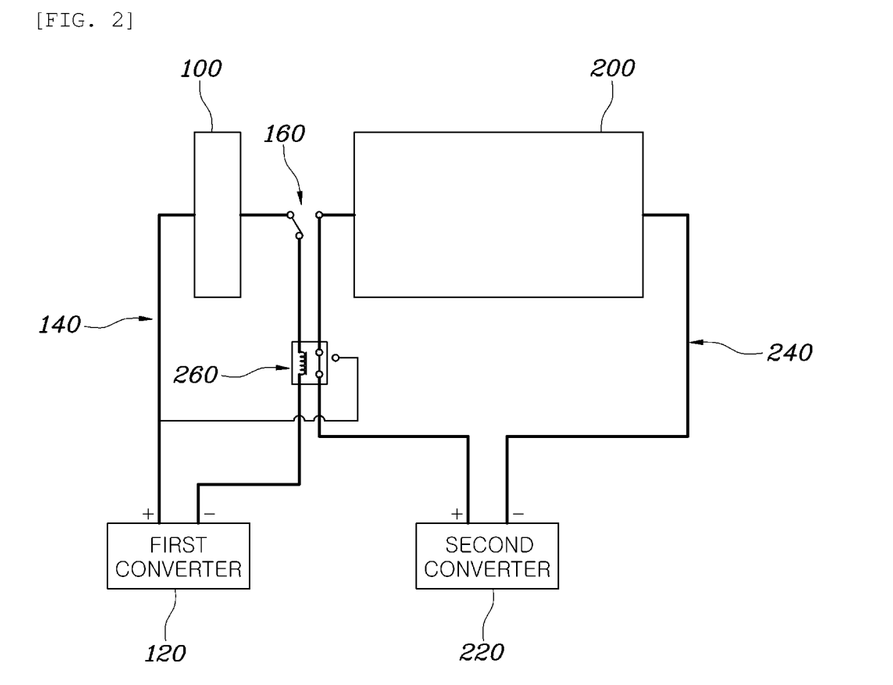
Figure 3:
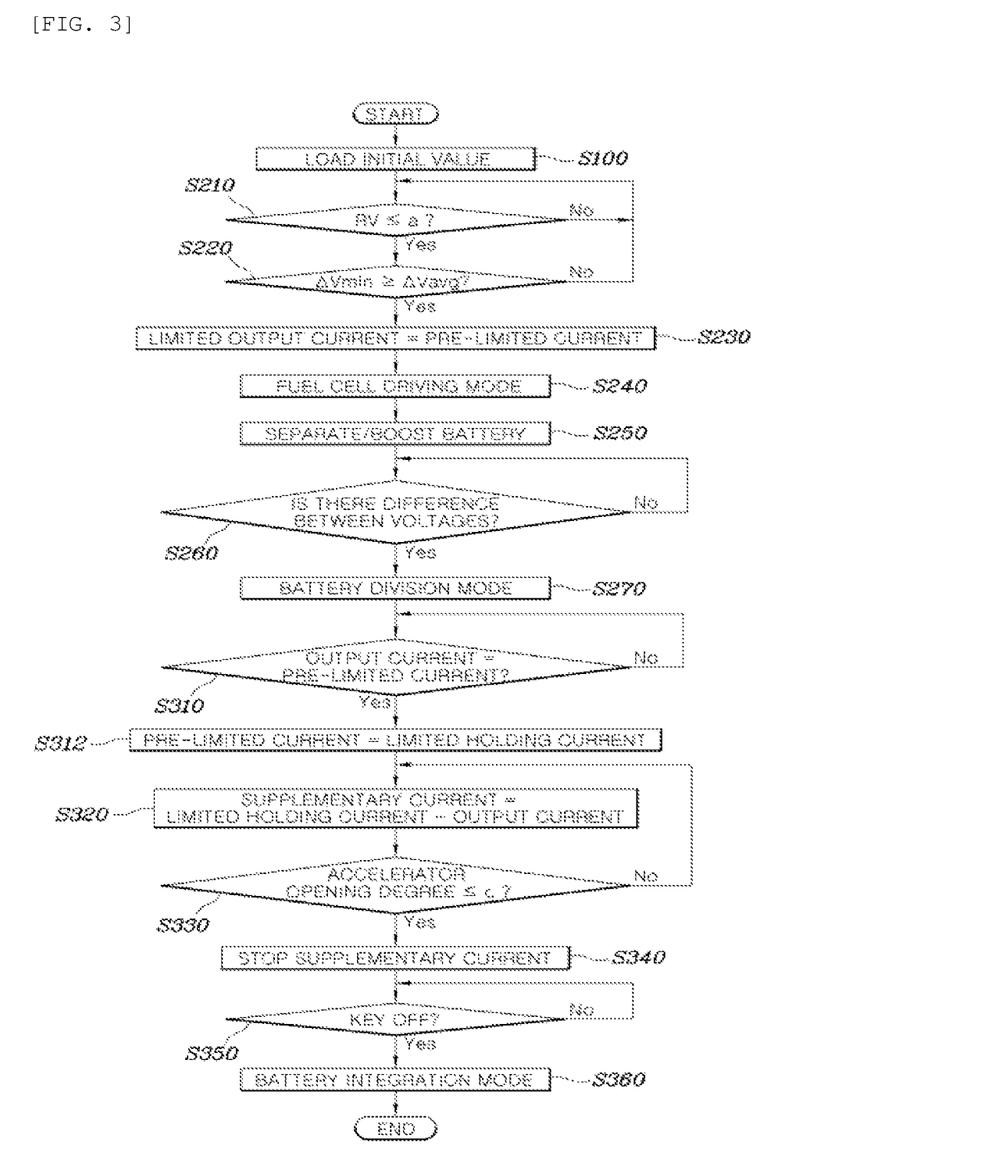
FIGS. 3 and 4 are flowcharts illustrating a method of controlling energy supply in a fuel cell vehicle according to an embodiment of the present disclosure.
Figure 4:
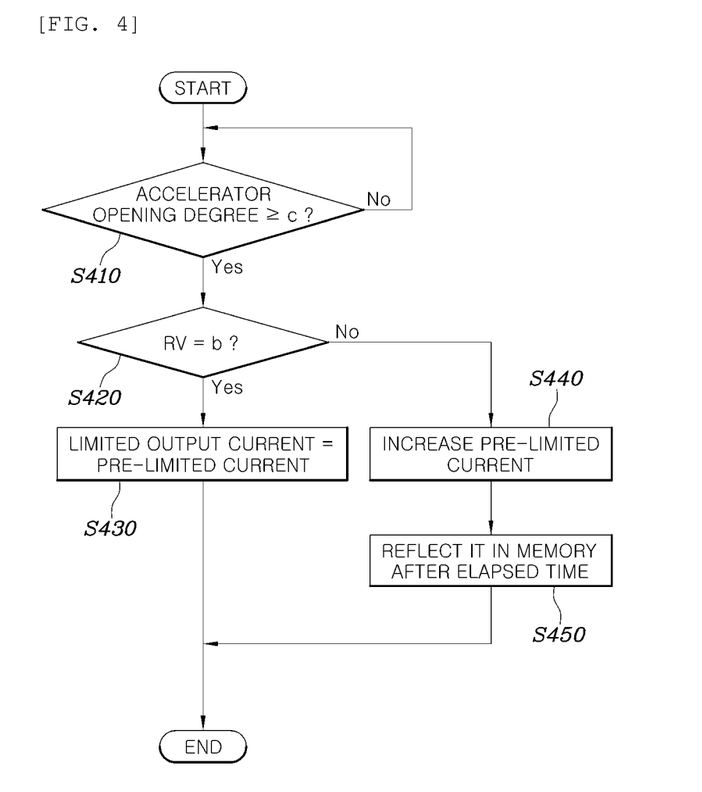

FIGS. 1 and 2 are diagrams illustrating a system for controlling energy supply in a fuel cell vehicle according to an embodiment of the present disclosure. FIGS. 3 and 4 are flowcharts illustrating a method of controlling energy supply in a fuel cell vehicle according to an embodiment of the present disclosure.

Referring to FIGS. 3 and 4, the method of controlling energy supply in a fuel cell vehicle according to an embodiment of the present disclosure includes a step (S430) of storing an output current of a fuel cell as a pre-limited current when a cell voltage ratio, which is obtained by dividing a minimum cell voltage by an average cell voltage, reaches a minimum cell voltage ratio, a step of monitoring the cell voltage ratio, a step (S230) of setting a limited output current of the fuel cell as the pre-limited current when the cell voltage ratio reaches a hazard cell voltage ratio, a step (S270) of connecting first and second high-voltage batteries to a main bus terminal in parallel when the cell voltage ratio reaches the hazard cell voltage ratio, and a step (S320) of outputting a supplementary current from the second high-voltage battery by an insufficient amount of the output current of the fuel cell for the pre-limited current when the output current of the fuel cell reaches a predetermined range of the limited output current that is set as the pre-limited current.

Although an embodiment of the present disclosure describes an example in which the first and second high-voltage batteries are used as a high-voltage battery, even when three or more high-voltage batteries are provided in the embodiment, one of them may be used a first high-voltage battery and the other may be used as a second high-voltage battery. That is, since the embodiment of the present disclosure is sufficient if the vehicle includes at least two high-voltage batteries, the present disclosure is not limited to the number of batteries.

First, when the vehicle is started, initial values that are previously stored in a memory are loaded (S100). The initial values include a minimum cell voltage ratio, a hazard cell voltage ratio, a limited output current, a pre-limited current, etc.

The fuel cell is controlled to output only a current that is equal to or less than the limited output current in order to prevent damage to the cell due to an inverse voltage or the like. In an embodiment of the present disclosure, a pre-limited current value is separately provided, in addition to the limited output current, to predict a cell leak and limit the output of the fuel cell according to the pre-limited current before the voltage of the cell rapidly drops in practice. Accordingly, the vehicle is provided with two limit values of the limited output current and the pre-limited current, and limits the output of the fuel cell based on a lower value from among the limit values.

The cell voltage ratio (RV) is a value obtained by dividing a minimum cell voltage by an average cell voltage. Accordingly, the minimum voltage of the call is very low as the cell voltage ratio is low, and therefore it can be seen that a cell leak is likely to occur. Thus, the step of storing an output current of a fuel cell as a pre-limited current when a cell voltage ratio reaches a minimum cell voltage ratio is performed. That is, when an accelerator opening degree is equal to or greater than a reference value (c) (e.g. 10%) (S410), as illustrated in FIG. 4, it can be seen that the vehicle is started to a degree, in which case when the cell voltage ratio is lowered to the predefined minimum cell voltage ratio (b) (S420) when the output is generated in the fuel cell, the pre-limited current is updated as a current value that is currently generated by the fuel cell (S430).

When the cell voltage ratio is normal, the pre-limited current is slightly increased and returned back to the original state (S440). In this process, the pre-limited current is slowly updated for a certain time to prevent a rapid change in control (S450).

Here, the minimum cell voltage ratio may be a minimum value at which no inverse voltage is generated when the output is generated in the fuel cell. In general, since an inverse voltage is likely to be generated when the cell voltage ratio is equal to or less than 0.74, the minimum cell voltage ratio is preferably set to be about 0.75 in the memory. The cell voltage ratio (RV) of 0.74 in a stack is a minimum value at which no inverse voltage is generated when the output is generated in the stack. In a case where the average cell voltage in the stack is 0.90 V, when the RV is 0.74, the minimum cell voltage in the stack is 0.66 V. If the minimum cell voltage in the stack is 0.66 V in a channel formed by tying four cells, this state is immediately before an inverse voltage is generated since three cells have a voltage of 0.90 V and the other cell has a voltage of 0.06 V in the worst case. Thus, when the RV is 0.74, no current is extracted from the cell to prevent generation of an inverse voltage, whereas when the RV is equal to or less than 0.74, the current must be reduced since there is a possibility of an inverse voltage being already generated.

Next, the step of monitoring the cell voltage ratio is performed. When the cell voltage ratio reaches the hazard cell voltage ratio (S210), the step (S230) of setting a limited output current of the fuel cell as the pre-limited current is performed. Here, in the step of setting a limited output current of the fuel cell as the pre-limited current, the limited output current of the fuel cell may be set as the pre-limited current (S230) when the cell voltage ratio reaches the hazard cell voltage ratio (S210) and a drop rate of change for the minimum cell voltage is larger than a drop rate of change for the average cell voltage (S220).

The hazard cell voltage ratio is greater than the minimum cell voltage ratio, and when the minimum cell voltage ratio is 0.75, the hazard cell voltage ratio may be about 0.8. Accordingly, when the cell voltage ratio of the fuel cell is lowered to the hazard cell voltage ratio, an inverse voltage is not immediately generated but is likely to be generated. Moreover, when the drop rate of change for the minimum cell voltage is larger than the drop rate of change for the average cell voltage, the voltage of a specific cell may rapidly drop, which may lead to a cell leak in the future. Thus, the pre-limited current value as a reference for limiting an output current is set to limit the current in advance. In this way, by checking the state of the fuel cell in advance and limiting a current that causes a cell leak, it is possible to prevent the fuel cell from deteriorating and to secure the time for gradually recovering the fuel cell.

To this end, the output current of the fuel cell is suddenly reduced. However, since the control for current limit is performed coincidentally but it is difficult to expect an instantaneous response in auxiliary machinery for limiting the output of the fuel cell, the vehicle may exhibit abnormal behavior such as lurching for a certain time. That is, when the output current of the fuel cell is lowered from a level of 100 to a level of 50, a supply amount of air must be reduced. In this case, hysteresis may occur due to characteristics of fluid, and the output current thus moves up and down and is then converged in the vicinity of the level of 50, resulting in lurching. In addition, lurching may be exhibited when the voltage of the cell is rapidly lowered in the process of dropping the output current.

Accordingly, in order to prevent the abnormal behavior, such as lurching, of the vehicle due to the lack of power according to the current limit, there is a need for a means for instantaneously replenishing power. FIGS. 1 and 2 illustrate a switching process for replenishing power. For the switching process, the high-voltage battery of the vehicle may be topologically divided into two batteries or the batteries may be integrated with each other.

That is, when the cell voltage ratio reaches the hazard cell voltage ratio, the step (S270) of connecting first and second high-voltage batteries to a main bus terminal in parallel is performed. When the cell voltage ratio reaches the hazard cell voltage ratio, the high-voltage battery is divided into the first and second high-voltage batteries so that the first high-voltage battery realizes a conventional hybrid mode together with the fuel cell and the second high-voltage battery is merely in a stand-by state. When the output current of the fuel cell reaches the limited output current that is set as the pre-limited current or is within the predetermined range of the limited output current (S310), the step (S320) of outputting a supplementary current from the second high-voltage battery by an insufficient amount of the output current of the fuel cell for the pre-limited current is performed to secure drivability by instantaneously replenishing power in case of lurching.

When one high-voltage battery is used as in the related art, the high-voltage battery may not have a sufficient state of charge and the charge/discharge of current may consistently occur due to characteristics of hybrid driving. Thus, the battery is divided into two batteries, and one of them supports the fuel cell as in the related art while the other battery instantaneously outputs a current by an insufficient amount of the output current of the fuel cell for the pre-limited current in a charged and stand-by state to replenish power and prevent a reduction of driving force.

Therefore, since the fuel cell is effectively protected while not being deteriorated and the overall power of the vehicle is not rapidly reduced, it is possible to satisfy both durability and drivability.

In addition, the pre-limited current is a value that may vary depending on the variation in the cell voltage ratio of the fuel cell. Therefore, when the output current of the fuel cell reaches the predetermined range of the limited output current that is set as the pre-limited current, the pre-limited current is set as a limited holding current to be fixed as an unchanged value (S312). Then, the supplementary current may be output from the second high-voltage battery by an insufficient amount of the output current of the fuel cell for the limited holding current that is a fixed value. That is, the power of the vehicle may be uniformly maintained during the output of the supplementary current even when the pre-limited current is changed, thereby preventing the drivability of the vehicle from deteriorating.

Meanwhile, the method according to an embodiment of the present disclosure may further include a step (S360) of connecting the first and second high-voltage batteries in series when the ignition key or the ignition of the vehicle is off. That is, even when the high-voltage batteries are used in the divided state, they are integrated to prepare for next ignition when the ignition of the vehicle is off. The high-voltage batteries usually support the fuel cell in the state in which they are integrated as one battery as in the related art.

In the step (S270) of connecting first and second high-voltage batteries to a main bus terminal in parallel, when the cell voltage ratio reaches the hazard cell voltage ratio, only the fuel cell generates a required output for system (S240). Next, the first and second high-voltage batteries may be boosted such that the voltage at each output end thereof reaches the voltage at the output end of the fuel cell (S250), and then the first and second high-voltage batteries may be connected in parallel to the main bus terminal when the difference between the voltages is less than 10 V (S260). Through such a process, it is possible to prevent a short circuit due to overvoltage and protect a circuit in the process of dividing the battery.

In addition, when the required output for system is equal to or less than a reference value after the step of outputting a supplementary current from the second high-voltage battery, the output of the supplementary current from the second high-voltage battery may be stopped (S340). That is, when the accelerator opening degree is equal to or less than a reference value (c) (e.g. 10%) (S330), the required output is low, in which case it is unnecessary to limit the output current since the output current itself is low. Therefore, there is a low probability of abnormal behavior such as lurching. Accordingly, in this case, it is possible to improve fuel efficiency by integrating the high-voltage batteries again and sufficiently performing regenerative braking.

FIGS. 1 and 2 are diagrams illustrating a system for controlling energy supply in a fuel cell vehicle according to an embodiment of the present disclosure. A switch may realize a division mode, in which first and second high-voltage batteries 100 and 200 are connected in parallel to a main bus terminal 600 through respective first and second converters 120 and 220, or an integration mode in which the first and second high-voltage batteries 100 and 200 are connected in series and are connected in parallel to the main bus terminal 600 through the second converter 220.

The first high-voltage battery 100 and the first converter 120 may be connected to a first circuit 140, the second high-voltage battery 200 and the second converter 220 may be connected to a second circuit 240, and the first and second circuits 140 and 240 may be separated from or connected to each other through first and second switches 160 and 260. Although an embodiment of the present disclosure describes an example in which the first and second high-voltage batteries are used as a high-voltage battery, even when three or more high-voltage batteries are provided in the embodiment, one of them may be used a first high-voltage battery and the other may be used as a second high-voltage battery.

The first switch 160 is provided between the first high-voltage battery 100 and the second high-voltage battery 200 so that the first and second high-voltage batteries 100 and 200 may be separate from each other or connected in series.

The second switch 260 is provided between the first circuit 140 and the second circuit 240 at a point between the high-voltage batteries and the converters so that the first and second circuits 140 and 240 may be separated from each other or connected in series.

FIG. 1 illustrates the integration mode. In the integration mode, the first and second high-voltage batteries 100 and 200 are connected in series to constitute one battery by the operation of the first and second switches 160 and 260, and they are connected in parallel to the main bus terminal 600 through the second converter 220.

FIG. 2 illustrates the division mode. In the division mode, the first and second high-voltage batteries 100 and 200 are respective batteries separated by the operation of the first and second switches 160 and 260, and they are connected in parallel to the main bus terminal 600 through the respective first and second converters 120 and 220. In this case, the first high-voltage battery 100 serves to perform the hybrid driving of a motor 400 together with a fuel cell 300, and the second high-voltage battery 200 serves to output a supplementary current as necessary.

The system for controlling energy supply in a fuel cell vehicle according to an embodiment of the present disclosure includes a voltage sensor 201 that detects a voltage of each of fuel cells to calculate a cell voltage ratio in real time. A minimum cell voltage ratio, a hazard cell voltage ratio, a limited output current, and a pre-limited current are stored in a memory, and they may be updated in a control process to be utilized for next ignition.

The system includes a controller 500 that controls the driving of the switch and the fuel cell. The controller 500 updates the pre-limited current in the memory as an output current of the fuel cell when the cell voltage ratio reaches the minimum cell voltage ratio, sets the limited output current of the fuel cell as the pre-limited current and switches to the division mode for the first and second high-voltage batteries through the switch when the cell voltage ratio reaches the hazard cell voltage ratio, and controls the second converter to output the supplementary current from the second high-voltage battery by an insufficient amount of the output current of the fuel cell for the pre-limited current when the output current of the fuel cell reaches a predetermined range of the limited output current that is set as the pre-limited current.

According to the method and system for controlling energy supply in a fuel cell vehicle according to the present disclosure, it is possible to enhance durability of the fuel cell and effectively manage the high-voltage battery by preventing the abnormal behavior of the vehicle and predicting the drop in cell voltage in protecting the fuel cell with the current limit when the voltage of the fuel cell drops.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A method of controlling energy supply in a fuel cell vehicle, comprising steps of:
    storing an output current of a fuel cell as a pre-limited current when a cell voltage ratio, which is obtained by dividing a minimum cell voltage by an average cell voltage, reaches a minimum cell voltage ratio;
    monitoring the cell voltage ratio;
    setting a limited output current of the fuel cell as the pre-limited current when the cell voltage ratio reaches a hazard cell voltage ratio;
    connecting first and second high-voltage batteries to a main bus terminal in parallel when the cell voltage ratio reaches the hazard cell voltage ratio; and
    outputting a supplementary current from the second high-voltage battery by an insufficient amount of the output current of the fuel cell for the pre-limited current when the output current of the fuel cell reaches a predetermined range of the limited output current that is set as the pre-limited current.

2. The method according to claim 1, wherein the minimum cell voltage ratio is a minimum value at which no inverse voltage is generated when an output is generated in the fuel cell.

3. The method according to claim 1, wherein the hazard cell voltage ratio is greater than the minimum cell voltage ratio.

4. The method according to claim 1, wherein, in the step of setting the limited output current of the fuel cell as the pre-limited current, when the cell voltage ratio reaches the hazard cell voltage ratio and a drop rate of change in the minimum cell voltage is higher than a drop rate of change in the average cell voltage, the limited output current of the fuel cell is set as the pre-limited current.

5. The method according to claim 1, further comprising connecting the first and second high-voltage batteries in series when an ignition key or ignition of a vehicle is off.

6. The method according to claim 1, wherein, in the step of connecting first and second high-voltage batteries to the main bus terminal in parallel, when the cell voltage ratio reaches the hazard cell voltage ratio, a required output for a system is generated only by the fuel cell, and the first and second high-voltage batteries are boosted, such that a voltage at each output end thereof reaches a voltage at an output end of the fuel cell, and are then connected in parallel to the main bus terminal.

7. The method according to claim 1, wherein, after the step of outputting the supplementary current from the second high-voltage battery, when a required output for a system is equal to or less than a reference value, the step of outputting the supplementary current from the second high-voltage battery is stopped.

8. The method according to claim 1, wherein, in the step of storing the output current of the fuel cell as the pre-limited current, the output current of the fuel cell is stored as the pre-limited current when the cell voltage ratio reaches the minimum cell voltage ratio in a state in which a required output for a system is equal to or more than a reference value.

9. The method according to claim 1, wherein, in the step of outputting the supplementary current from the second high-voltage battery, when the output current of the fuel cell reaches the predetermined range of the limited output current that is set as the pre-limited current, the pre-limited current is set as a limited holding current, and the supplementary current is outputted from the second high-voltage battery by an insufficient amount of the output current of the fuel cell for the limited holding current.

10. A system for controlling energy supply in a fuel cell vehicle, the system performing the method of controlling energy supply in a fuel cell vehicle according to claim 1, the system comprising:
a switch configured to realize a division mode, in which first and second high-voltage batteries are connected in parallel to a main bus terminal through a respective first and second converter, or an integration mode in which the first and second high-voltage batteries are connected in series while being connected in parallel to the main bus terminal through the second converter;
a voltage sensor configured to detect a voltage of each fuel cell;
a memory configured to store a minimum cell voltage ratio, a hazard cell voltage ratio, a limited output current, and a pre-limited current; and
a controller for controlling driving of the switch and the fuel cell, the controller being configured to:
update the pre-limited current in the memory as an output current of the fuel cell when a cell voltage ratio reaches the minimum cell voltage ratio,
set the limited output current of the fuel cell as the pre-limited current and switch to the division mode for the first and second high-voltage batteries through the switch when the cell voltage ratio reaches the hazard cell voltage ratio, and
control the second converter so as to output a supplementary current from the second high-voltage battery by an insufficient amount of the output current of the fuel cell for the pre-limited current when the output current of the fuel cell reaches a predetermined range of the limited output current that is set as the pre-limited current.

11. The system according to claim 10, wherein the first high-voltage battery and the first converter are connected to a first circuit, the second high-voltage battery and the second converter are connected to a second circuit, and the first and second circuits are separated from or connected to each other through first and second switches.

12. The system according to claim 11, wherein the first switch is provided between the first high-voltage battery and the second high-voltage battery so that the first and second high-voltage batteries are separate from each other or connected in series.

13. The system according to claim 11, wherein the second switch is provided between the first circuit and the second circuit at a point between the first and second high-voltage batteries and the first and second converters so that the first and second circuits are separated from each other or connected in series.

* * * * *